(12) United States Patent
Ifergan

(10) Patent No.: US 7,175,275 B2
(45) Date of Patent: Feb. 13, 2007

(54) MULTIPURPOSE EYEGLASS DEVICE

(75) Inventor: Thierry Ifergan, Aventura, FL (US)

(73) Assignee: Chic Optic Inc., Montreal (CA)

( * ) Notice: Subject to any disclaimer, the term of this patent is extended or adjusted under 35 U.S.C. 154(b) by 0 days.

(21) Appl. No.: 11/015,742

(22) Filed: Dec. 20, 2004

(65) Prior Publication Data
US 2005/0157249 A1   Jul. 21, 2005

Related U.S. Application Data

(60) Provisional application No. 60/530,258, filed on Dec. 18, 2003.

(51) Int. Cl.
  *G02C 1/04* (2006.01)
  *G02C 9/00* (2006.01)
(52) U.S. Cl. .................. 351/105; 351/47; 351/57; 351/106; 351/124
(58) Field of Classification Search ............ 351/47, 351/48, 57, 58, 103–109
See application file for complete search history.

(56) References Cited

U.S. PATENT DOCUMENTS 5,410,763 A    5/1995   Bollé

6,764,175 B1 *  7/2004  Chen ..................... 351/47

FOREIGN PATENT DOCUMENTS

| DE | 85 07 761.5 U1 | 6/1985 |
|---|---|---|
| DE | 39 05 041 A1 | 8/1990 |

* cited by examiner

*Primary Examiner*—Huy Mai
(74) *Attorney, Agent, or Firm*—Ralph A. Dowell; Dowell & Dowell, P.C.

(57) ABSTRACT

A pair of spectacles includes a main frame having a magnetic bridge piece. An auxiliary inner frame is secured by a magnetic member to the bridge piece and an outer auxiliary lens is similarly secured by a magnet to the bridge piece and at lateral locations onto edges of the main frame. The auxiliary outer lens is secured by a magnetic button which is inserted through an aperture in the outer lens and has a magnetic member an a head which is sized to overly the aperture. The magnetic member embedded in the button attracts the magnetic bridge piece thereby attaching the button to the main frame, the head overlies the aperture and secures the outer frame to the main frame.

29 Claims, 6 Drawing Sheets

MULTIPURPOSE EYEGLASS DEVICE

This application claims priority from U.S. Provisional Patent Application No. 60/530,258 filed on Dec. 18, 2003.

FIELD OF THE INVENTION

The present invention relates generally to spectacles and more specifically to interchangeable auxiliary lens assemblies for use with such spectacles.

DESCRIPTION OF THE PRIOR ART

The use of spectacles to improve vision and correct deficiencies is well known. Similarly, the use of auxiliary lenses with spectacles to accommodate varying conditions is also well known. These conditions may include for instance the varying presence of extreme sunlight or the need for different prescriptive lenses dependent upon where the focus for vision is directed.

Auxiliary lenses are known to be secured to spectacles by magnets incorporated into both the spectacle and auxiliary frame. This is shown in U.S. Pat. No. 5,568,207 to Chao wherein a support situated at the joint of the temple and the lens frame contains a horizontally placed magnet that attaches to a mating magnet on the auxiliary frame, Such an arrangement has made the placement or removal of such an auxiliary frames more convenient. However this arrangement allows only a single auxiliary frame to be conveniently mounted and any additional frames would render a bulky assembly.

U.S. Pat. No. 5,410,763 to Bollé shows a pair of ski goggles in which a main frame is utilized to support a tinted lens within the periphery of the frame and a pair of prescription lenses can be attached to the interior of the main frame. The design is intended for protective eyewear, particularly for skiing and the assembly is intentionally bulky to allow adequate spacing between the lenses to reduce fogging effects.

DGbm 85 07 761 shows an eyeglass in which a lens is secured to a main frame by a magnet located at the bridge. This allows different lenses to be utilized but requires the complete removal of a lens to change the overall characteristics of the eyeglasses.

It is therefore an object of the present invention to provide an interchangeable lens assembly and eyeglasses incorporating such an assembly which obviates or mitigates the above disadvantages.

SUMMARY OF THE INVENTION

In one aspect, the present invention provides an interchangeable lens assembly comprising a main frame having first and second portions interconnected to one another by a first bridge portion. The first bridge portion has a forward facing magnetic surface and each of the first and second portions has at least one connector thereon laterally spaced from the first bridge portion. An outer auxiliary lens is also provided with a centrally located aperture for aligning with the forward magnetic surface and a plurality of connectors thereon laterally spaced from the aperture and positioned for alignment with the at least one connector on each of the first and second portions for attachment thereto. A retaining button is provided having a magnetic member for magnetic attraction with the forward facing magnetic surface and sized to pass through the aperture to allow interchangeable attachment of the outer auxiliary lens to the main frame.

In another aspect, the present invention further provides an inner auxiliary lens having a second bridge portion and a second magnetic member on the second bridge portion for magnetic attraction with a rearward facing magnetic surface on the first bridge portion to allow interchangeable attachment of the inner auxiliary lens to the main frame.

In yet another aspect, the present invention provides an interchangeable lens assembly comprising a main frame having a bridge portion, a first auxiliary frame disposed to one side of the bridge portion and a second auxiliary frame disposed to an opposite side of the bridge portion, wherein the first and second auxiliary frames are secured to oppositely directing faces of the bridge portion by magnetic attraction.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
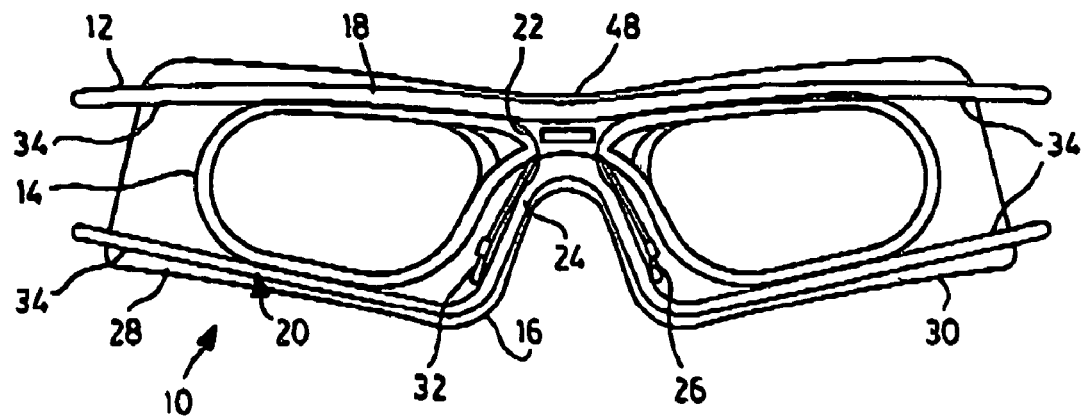
FIG. 1 is front view of an assembled spectacle arrangement.
Figure 2:
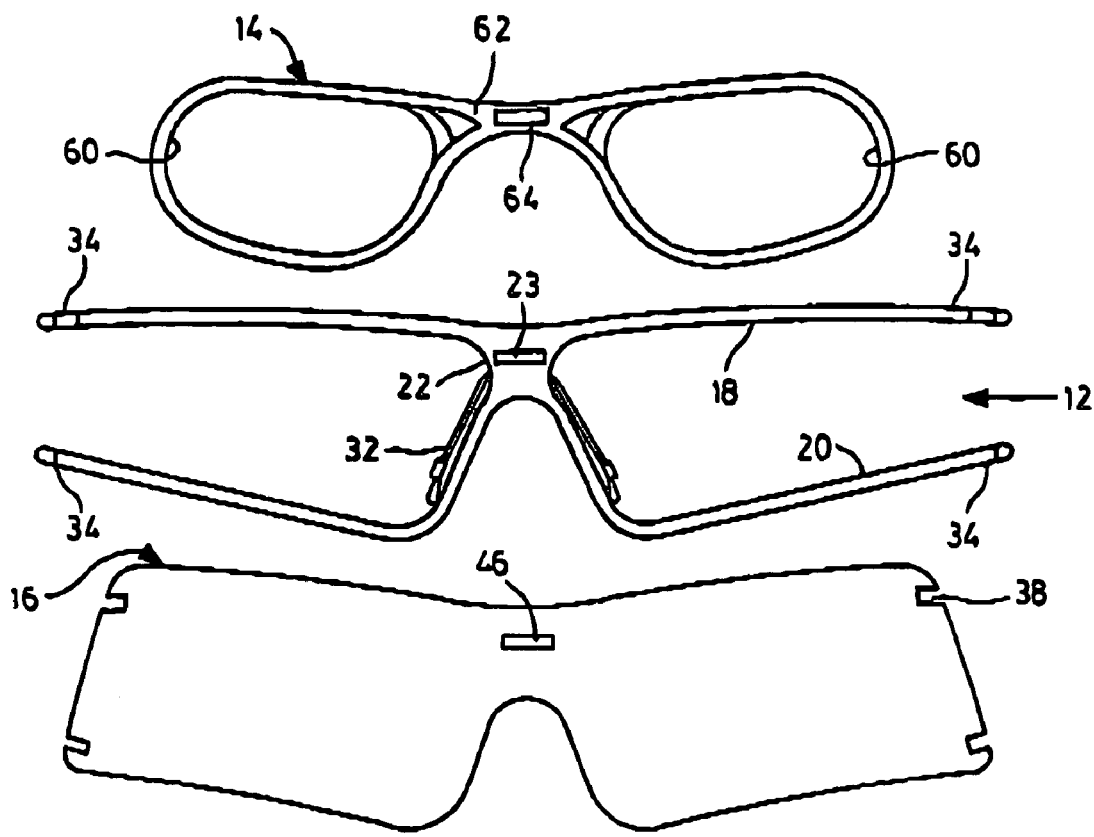
FIG. 2 is a exploded view of the components of the spectacles of FIG. 1.
Figure 3:
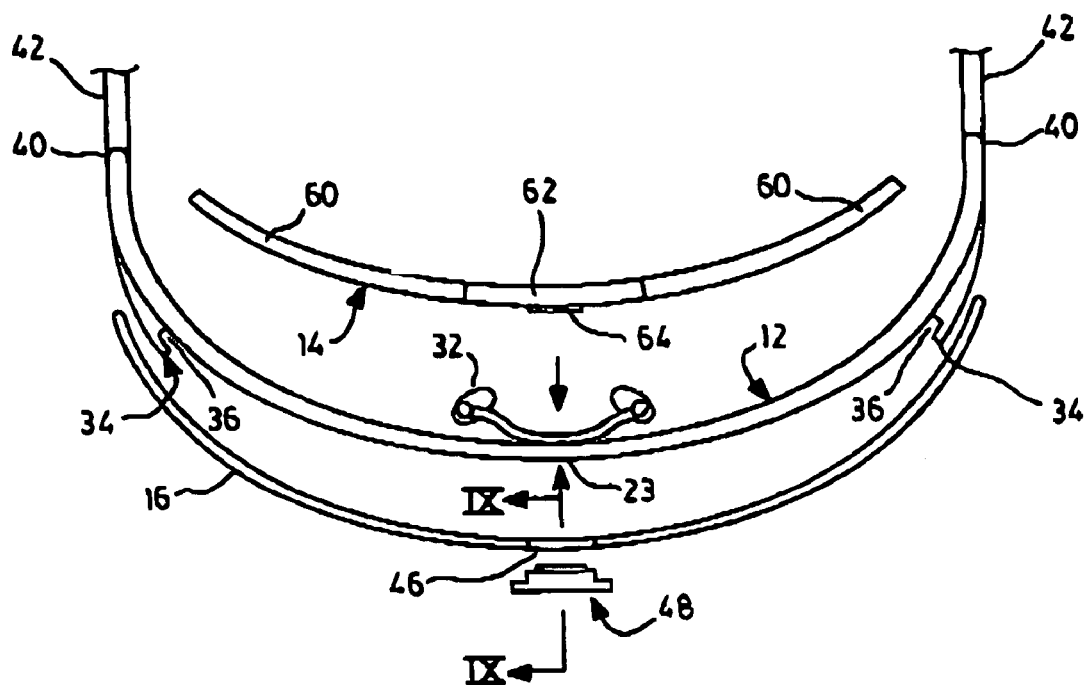
FIG. 3 is an exploded top view of the spectacle arrangement of FIG. 1.
Figure 4:
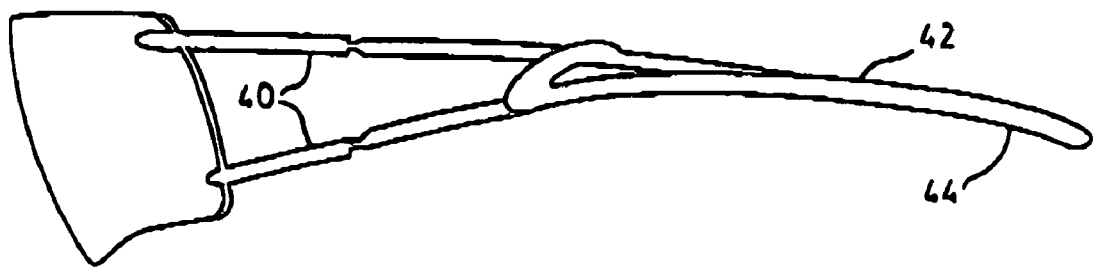
FIG. 4 is a side view of the spectacle arrangement of FIG. 1.
Figure 5:
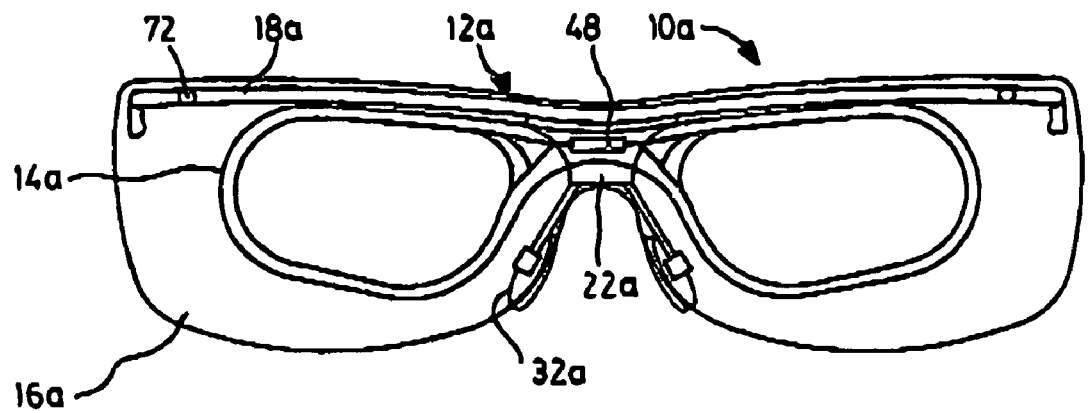
FIG. 5 is a front view of a further embodiment of the spectacle.
Figure 6:
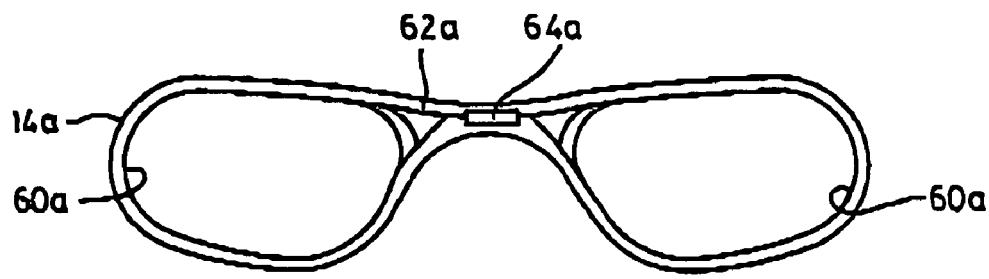
FIG. 6 is an exploded front view of the embodiment of FIG. 5.
Figure 6:
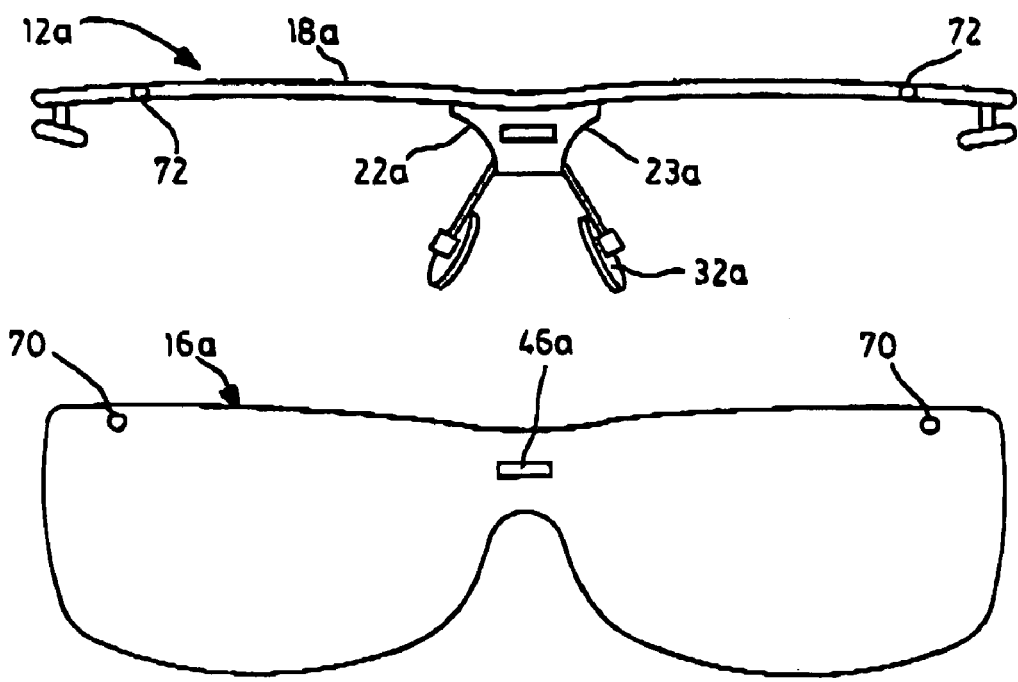

Referring therefore to the first embodiment shown in FIGS. 1 through 4, spectacles 10 include a main frame 12 that supports an inner auxiliary frame 14 and an outer auxiliary lens 16. The main frame 12 is formed with upper and lower bars 18, 20 respectively which are interconnected by a bridge piece 22 centrally located. The lower bar 20 is connected centrally to the bridge piece 22 with nose portions 24, 26 extending downwardly and outwardly from opposite sides. The nose portions 24, 26 merge smoothly with lower runs 28, 30 respectively that extend latterly to the temple region. The main frame 12 is formed from a magnetic material or has a magnetic insert 23 (e.g. as shown in FIG. 2) incorporated into the bridge piece 22. Nose pads are 32 are secured to the bridge piece 22 to support the spectacles 10 on the user.

The upper and lower bars 18, 20 have retaining clips 34 formed at their distal end, The clips 34 have an opening 36 directed towards the bridge piece 22 which cooperate with complementary notches 38 formed on the outer auxiliary lens 16. Each of the bars 18, 20 terminates in a hinge 40 that connects the bars 18, 20 to the side pieces 42. As can most easily be seen in FIG. 4, the side pieces 42 converge in a rearward direction and are secured in an earpiece 44.

Figure 9:
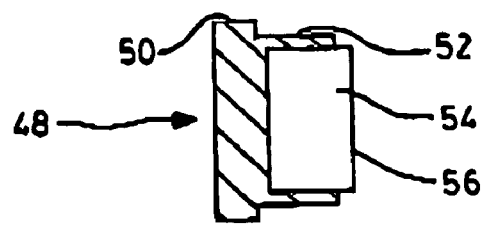
FIG. 9 is a view on the line IX—IX of FIG. 3.

The outer auxiliary lens 16 has an outer shape conforming generally to the shape of the main frame 12 with the notches 38 disposed on opposite sides for engagement in the openings 36 of the main frame 12. An aperture 46 is provided coincident with the bridge piece 22 and receives a magnetic button 48. As can be seen in FIG. 9, the button 48 has an enlarged head 50 that overlies the aperture 46 and a body 52 dimensioned to pass through the aperture 46. A magnet 54 is located in the body 52 and has an exposed end face 56 that engages with the bridge piece 22. The central portion of the outer auxiliary lens is thus retained by magnetic attraction between the button 48 and the bridge piece 22 and the outer edges secured to the bars 18, 20 through the interaction of notches 38 within openings 36.

The inner auxiliary frame 14 includes a pair of lens openings 60 in which prescription lenses may be secured. The lens openings 60 are interconnected by a bridge 62 with a magnet 64 embedded centrally in the bridge 62. The magnet 64 is positioned to be engageable with the rear surface of bridge piece 22 and thereby secure the inner auxiliary frame 14 to the main frame 12.

In use, the inner auxiliary frame 14 is preferably fitted with prescription lenses to suit a particular user and may be secured to the bridge piece 22 of the main frame by the magnet 64. The magnet 64 has sufficient strength to firmly secure the auxiliary frame 14 to the main frame 12 by magnetic attraction.

The auxiliary outer lens 16 is similarly secured to the main frame by engagement of the notches 38 in the openings 36 and the insertion of the button 48. The auxiliary outer lens 16 thus overlies the prescription lens opening 60 whilst the main frame 12 allows unobstructed view through the lens openings 62 and auxiliary lens 16, Of course the auxiliary lens 16 may be tinted such as for sunglass use or may have different colours or treatment to complement particular applications. The outer auxiliary lens 16 is interchangeable so that different configurations and characteristics of the lens may be utilized.

In the event that the outer auxiliary lens 16 is not required, it may simply be removed leaving the inner auxiliary frame 14 in situ. The inner auxiliary frame 14 may also be changed to suit particular circumstances and conditions or may not be required in particular circumstances. It will be noted that the main frame 12 is used to support the spectacles on the user so that undue loads are not placed on the magnetic connection between the bridge piece 22 and the outer auxiliary lens 16 or inner auxiliary frame 14. It will also be noted that the aperture 46 is preferably rectangular in shape and the housing 52 will be of complimentary shape to enhance location of the outer auxiliary lens 16 on the main frame 12.

A further embodiment is shown in FIGS. 5 through 8 in which like reference will be utilized with like components with a suffix "a" added for clarity. As may be seen in FIGS. 5 and 6, the main frame 12a of spectacles 10a is formed with a single bar 18a. A centrally located bridge piece 22a depends from the bar 11a to support the inner auxiliary frame 14a. A nose piece 32a depends from the bridge piece 22a to support the main frame 12a upon the nose of a user. As above, the bridge piece 22a may be made of a magnetic material or may have a magnetic member 23a inserted therein. An auxiliary lens 16a is secured by a magnetic button 48 to the bridge piece 22a by inserting the button 48 through an aperture 46a. The auxiliary lens 16a carries a pair of magnetic members 70 that cooperate with magnetic pads 72 formed on the upper bar 18a. The magnetic attraction between the magnetic members 70 and pads 72 secure the outer edges of the auxiliary lens 16a to the frame 12a and allow interchangeability of different configurations of lens. It will be appreciated that in an alternative configuration, the magnetic members 70 may be carried by the main frame 12a and the magnetic pads 72 carried by the auxiliary lens 16a as desired.

An arm 42a extends rearwardly from the main frame 12a via a hinge 40a terminating at an ear piece 44a as described above. An inner auxiliary frame 14a has like components to the frame 14 described above (i.e. lens openings 60a and a bridge portion 62a) and is attached to the main frame 12a in a similar manner to that described above.

Figure 7:
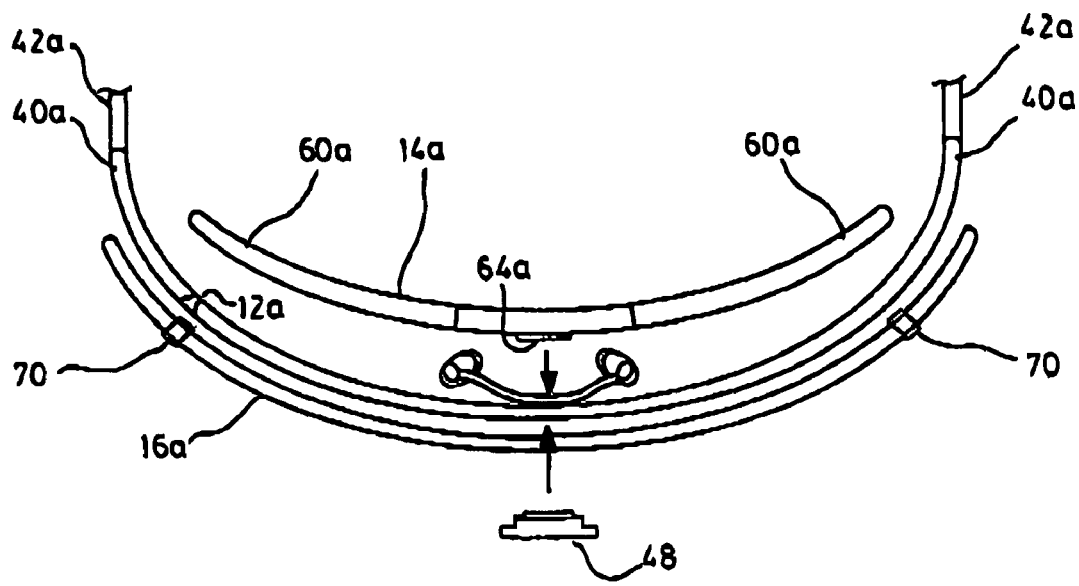
FIG. 7 is an exploded top view of the embodiment of FIG. 5.
Figure 8:
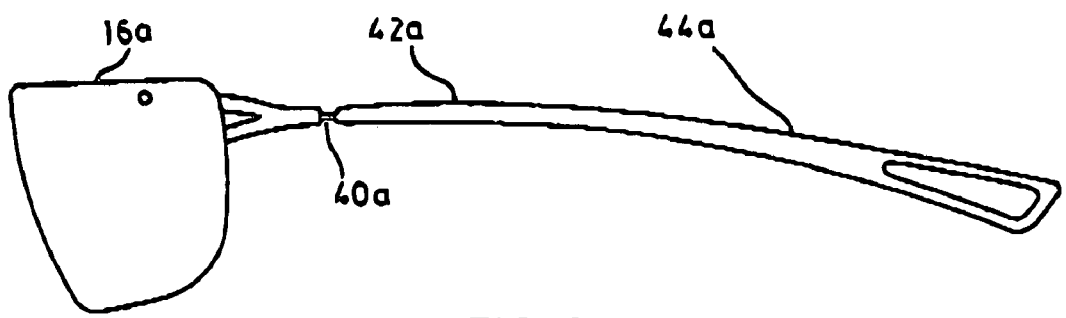
FIG. 8 is a side view of the embodiment of FIG. 5.
Figure 13:
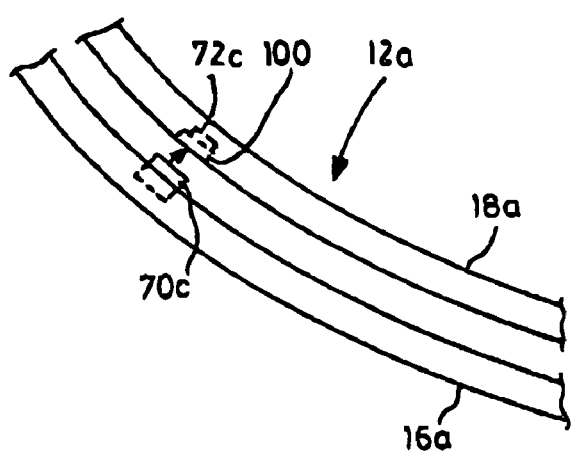
FIG. 13 is an enlarged view of a portion of the spectacle of FIG. 7.

Another configuration of the embodiment of FIG. 7 is shown in FIG. 13 where like numerals are given the suffix "c" for clarity. FIG. 13 shows an enlarged view of the interface between a magnetic member 70c carried by the auxiliary lens 16a and a magnetic pad 72c formed on the upper bar 18a. The magnetic member 70c protrudes from the auxiliary lens 16a and is sized to fit within a recess 100 formed in the bar 16a. The magnetic pad 72c in this example is embedded in the recess 100. The auxiliary frame 16a is secured to the bar 18a through magnetic attraction between the protruding magnetic member 70c and the magnetic pad 72c. When connected, the protruding portion of the member 70c lies within the recess 100 thereby inhibiting lateral movements of the auxiliary frame 16a relative to the bar 18a. It will be appreciated that the magnetic member 70c may be carried by the bar 18a and the recess 100 and magnetic pad 72c formed in the auxiliary lens 16a as desired. It will also be appreciated that the recess 100 may alternatively be made of a magnetic material itself whereby the magnetic pad 72c would embody the innermost surface of the recess 100.

Figure 10:
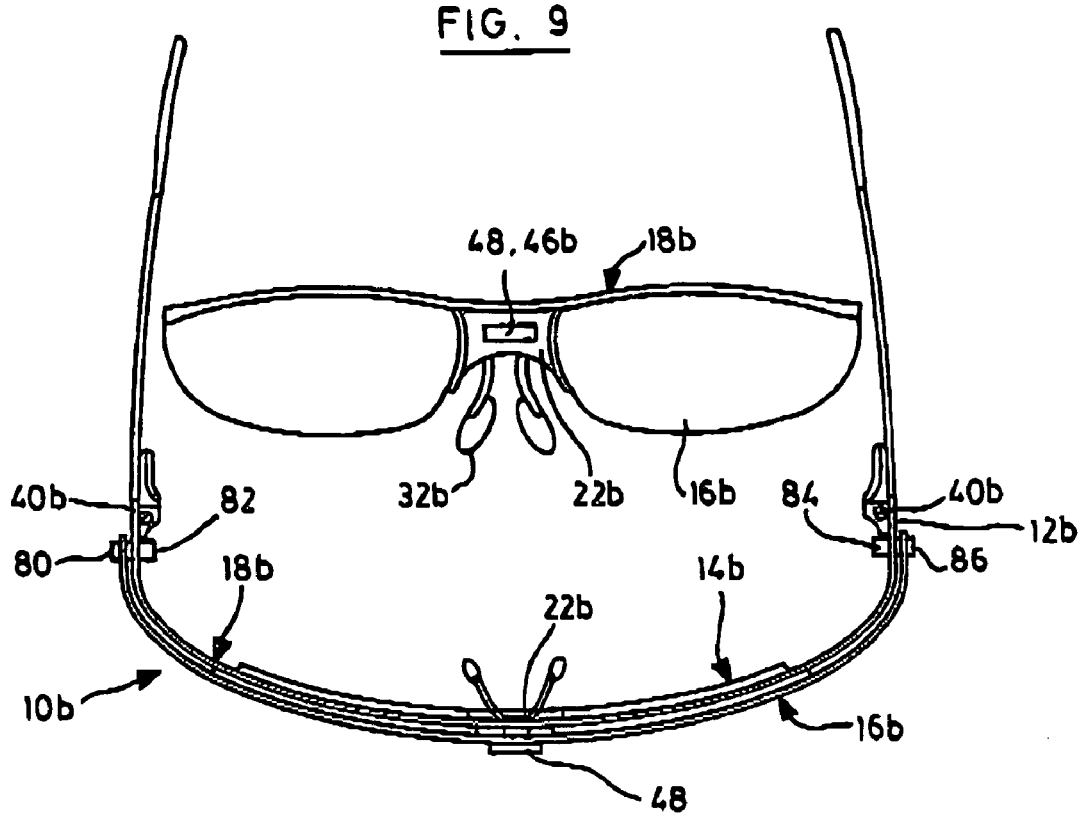
FIG. 10 is a front and top view of a further embodiment of the spectacle.
Figure 11:
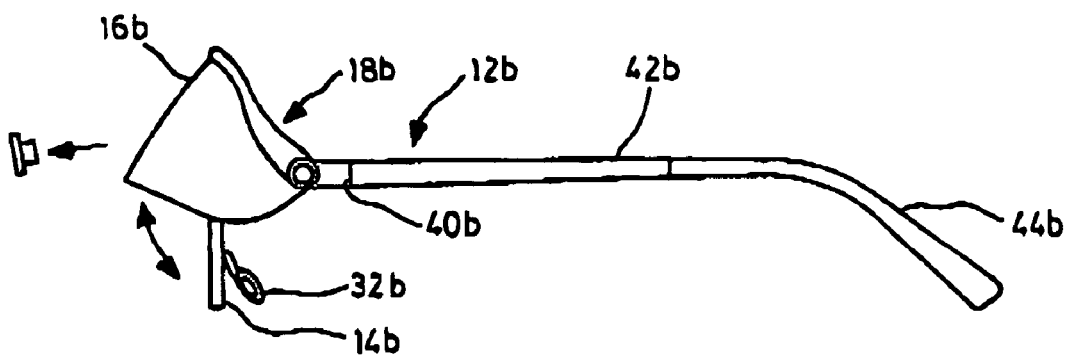
FIG. 11 is a side view of the embodiment of FIG. 10.
Figure 12:
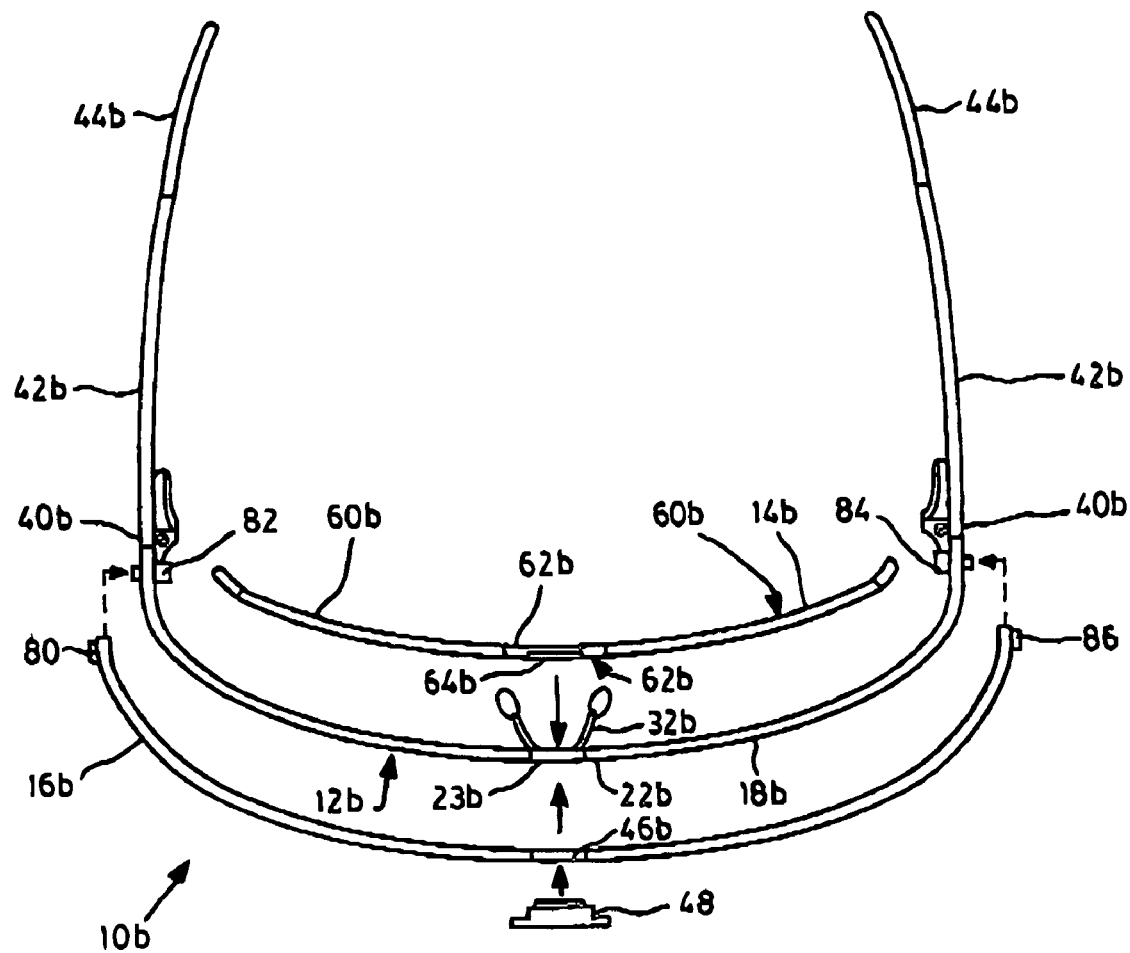
FIG. 12 is an exploded view of the embodiment of FIG. 10.

Another embodiment of the present invention is shown in FIGS. 10–12 in which like reference will be utilized with like components with a suffix "b" added for clarity. As may be seen most clearly in FIG. 11, the main frame 12b of the spectacles 10b is formed from a single bar 18b. A bridge piece 22b depending from the bar 18b has a nose piece 32b depending therefrom to support the spectacles 10b upon the nose of a user and has a magnetic insert 23b. A pair of magnetic pivot mounts 82, 84 are located on temple regions of the bar 18b. The temple regions extend rearwardly in a direction generally transverse to the bar 18b. The mounts 82, 84 therefore define an axis of rotation along a line therebetween which is rearwardly offset from the bar 18b and substantially parallel thereto, A hinge 40b adjacent the mounts 82, 84 pivotally connects an arm 42b that terminates at an ear piece 44b as described above.

An inner auxiliary frame 14b has a magnetic insert 64b at its bridge portion 62b, carries a pair of lenses 60b, and is attached to the bridge piece 22b through magnetic attraction therebetween similar to that described above.

An outer auxiliary lens 16b generally conforms to the shape of the bar 18b and extends at each end around to the respective temple region wherein the mounts 82, 84 are located. A pair of pivotal caps 80, 86 are sized to receive the mounts 82, 84 respectively. The outer auxiliary lens 16b has a centrally located aperture 46b sized to allow the body 52 of the magnetic button 48 to pass therethrough. The outer auxiliary lens 16b is pivotally mounted upon the main frame 12b by slightly pulling the ends of the lens 16b apart allowing the caps 80, 86 to slide over the mounts 82, 84 and couple therewith. The caps 80, 86 are retained on respective ones of the mounts by magnetic attraction between them. Both the caps 80, 86 and mounts 82, 84 may be magnets or only one may be a magnet with the other a magnetic material, as appropriate. In use this mounting arrangement allows a user to rotate the outer auxiliary lens 16b relative to the main frame 12b to "flip-up" the lens 16b out of view of the user. When it is desired to have the lens 16b in place, the user may secure the lens 16b to the main frame 12b by inserting the button 48 through the aperture 46b wherein by magnetic attraction, the button 48 will engage the magnetic material (or the magnetic insert 23b as shown in FIG. 12) of the bridge piece 22b as described above.

It will be seen therefore that a versatile structure is provided permitting a main frame to support a combination of auxiliary frames and lenses to optimize the utility of the spectacle. It will be noted that the main frame itself may also comprise a pair of lenses and that the main frame may support any combination of auxiliary frames described above and shall not be limited to any specific arrangement described.

It will be appreciated that the magnetic members described herein may embody individual magnets, may constitute part of the composition of the member to which it is employed, or may be of any suitable form which facilitates magnetic attraction as exemplified above.

The embodiments of the invention in which an exclusive property or privelage is claimed are defined as follows:

1. An interchangeable lens assembly comprising a main frame having first and second portions interconnected to one another by a first bridge portion, said first bridge portion having a forward facing magnetic surface, each of said first and second portions having at least one connector thereon laterally spaced from said first bridge portion; an outer auxiliary lens having a centrally located aperture for aligning with said forward magnetic surface and a plurality of connectors thereon laterally spaced from said aperture and positioned for alignment with said at least one connector on each of said first and second portions for attachment thereto; and a retaining button having a magnetic member for magnetic attraction with said forward facing magnetic surface and sized to pass through said aperture to allow interchangeable attachment of said outer auxiliary lens to said main frame.

2. A lens assembly according to claim 1 further comprising an inner auxiliary lens having a second bridge portion and a second magnetic member on said second bridge portion for magnetic attraction with a rearward facing magnetic surface on said first bridge portion to allow interchangeable attachment of said inner auxiliary lens to said main frame.

3. A lens assembly according to claim 2 wherein said first bridge portion has a magnetic member embedded therein, whereby said magnetic member provides both said forward facing magnetic surface and said rearward facing magnetic surface.

4. A lens assembly according to claim 2 wherein said inner auxiliary lens contains a pair of prescriptive lenses.

5. A lens assembly according to claim 4 wherein said outer auxiliary lens is reflective.

6. A lens assembly according to claim 1 wherein said at least one connector and said plurality of connectors are magnetic members providing magnetic attraction therebetween.

7. A lens assembly according to claim 1 wherein said at least one connector comprises a magnetic recess and said plurality of connectors are protruding magnetic members providing magnetic attraction therebetween.

8. A lens assembly according to claim 1 wherein said plurality of connectors comprise a magnetic recess and said at least one connector is a protruding magnetic member providing magnetic attraction therebetween.

9. A lens assembly according to claim 8 wherein said first and second portions each have one magnetic member laterally spaced at equal distances from said first bridge portion.

10. A lens assembly according to claim 8 wherein said magnetic members are located on rearward regions of said first and second portions, said rearward regions extending transverse said main frame from respective distal ends of said first and second portions, said magnetic members being aligned to define an axis of rotation along a line therebetween, whereby said outer auxiliary lens may be rotated with respect to said main frame about said axis of rotation.

11. A lens assembly according to claim 1 wherein said at least one connector is located on a forward facing surface of said main frame.

12. A lens assembly according to claim 1 wherein said first and second portions define an elongate bar.

13. A lens assembly according to claim 1 wherein said first and second portions comprise an upper bar and a lower bar, said upper and lower bars vertically spaced from each other to permit an unobstructed view therebetween.

14. A lens assembly according to claim 13 wherein said at least one connector comprises four retaining clips, respective ones of said retaining clips located at each end of said upper and lower bars for receiving respective notches formed at the edges of said outer auxiliary lens.

15. A lens assembly according to claim 1 wherein said retaining button has a body and a head located at a first end of said body, said head sized to overly said aperture and said magnetic member of said retaining button located at a second end of said body.

16. A lens assembly according to claim 15 wherein said body of said retaining button and said aperture are rectangularly shaped.

17. A lens assembly according to claim 1 wherein said first bridge portion has a magnetic member embedded therein, whereby said magnetic member provides said forward facing magnetic surface.

18. A lens assembly according to claim 1 wherein said main frame contains a pair of lenses.

19. A lens assembly according to claim 1 wherein said outer auxiliary lens is reflective.

20. An interchangeable lens assembly comprising a main frame having a bridge portion; a first auxiliary lens disposed to one side of said bridge portion and a second auxiliary lens disposed to an opposite side of said bridge portion, said main frame comprising at least a pair of connectors laterally spaced on outwardly directed surfaces of said main frame and located to either side of said bridge portion and positioned for co-operation with said first auxiliary lens to secure said first auxiliary lens to said outwardly directed surface, wherein said first and second auxiliary lenses are secured to oppositely directing surfaces of said bridge portion by magnetic attraction.

21. An interchangeable lens assembly according to claim 20 wherein each of said auxiliary lenses and said bridge portion have magnetic members associated therewith.

22. An interchangeable lens assembly according to claim 21 wherein said bridge portion includes a magnetisable material and at least one of said auxiliary lenses has a magnet associated therewith.

23. A lens assembly according to claim 20 wherein each of said connectors is a magnetic member.

24. A lens assembly according to claim 20 wherein said at least one connector comprises a plurality of retaining clips, respective ones of said retaining clips located about the periphery of said main frame for receiving respective notches formed at edges of said first auxiliary lens.

25. A lens assembly according to claim 20 wherein said main frame comprises an elongate bar and said bridge portion of said main frame depends from said elongate bar.

26. A lens assembly according to claim 25 wherein said elongate bar further includes a pair of connectors laterally spaced on an outwardly directed surface of said elongate bar to each side of said bridge portion for co-operation with said first auxiliary lens, to secure said first auxiliary lens to said outwardly directed surface.

27. A lens assembly according to claim 26 wherein each of said connectors is a magnetic member.

28. A lens assembly according to claim 20 wherein said bridge portion has a magnetic member embedded therein providing oppositely facing magnetic surfaces.

29. A lens assembly according to claim 20 wherein said first auxiliary lens includes a pair of prescriptive lenses, said first auxiliary lens being secured to a rearward facing one of said outwardly directed surfaces of said bridge portion and said second auxiliary lens includes a reflective lens with said second auxiliary lens secured to a forward facing one of said outwardly directed surfaces of said bridge portion.

* * * * *